(12) United States Patent
Wubben et al.

(10) Patent No.: US 6,966,501 B2
(45) Date of Patent: Nov. 22, 2005

(54) AGRICULTURAL BOOM STRUCTURE

(75) Inventors: Thomas Mark Wubben, Ankeny, IA (US); Kent Alvin Klemme, Ankeny, IA (US); Brenden Lew Stephens, Urbandale, IA (US); Henry Clifton Sink, III, Ankeny, IA (US); Clark Steel Thomas, Cambridge, IA (US); Micah Joel Berberich, Urbandale, IA (US)

(73) Assignee: Deere & Company, Moline, IL (US)

( * ) Notice: Subject to any disclaimer, the term of this patent is extended or adjusted under 35 U.S.C. 154(b) by 124 days.

(21) Appl. No.: 10/445,678

(22) Filed: May 27, 2003

(65) Prior Publication Data

US 2004/0238659 A1   Dec. 2, 2004

(51) Int. Cl.[7] ................................ B05B 1/20
(52) U.S. Cl. ....................... 239/168; 52/646
(58) Field of Search ............... 52/646, 108; 239/165, 239/166, 167, 168

(56) References Cited

U.S. PATENT DOCUMENTS

| | | | |
|---|---|---|---|
| 2,875,865 A * | 3/1959 | Rohn | 52/108 |
| 4,427,154 A | 1/1984 | Mercil | |
| 4,662,130 A * | 5/1987 | Miura et al. | 52/108 |
| 4,711,398 A | 12/1987 | Ganderton et al. | |
| 5,085,018 A * | 2/1992 | Kitamura et al. | 52/108 |
| 5,992,759 A | 11/1999 | Patterson | |
| 6,315,218 B1 | 11/2001 | Guesdon | |
| 2002/0113137 A1 | 8/2002 | Guesdon | |
| 2003/0052188 A1 | 3/2003 | Maliteare | |

FOREIGN PATENT DOCUMENTS

| | | | |
|---|---|---|---|
| DK | 1070455 A2 * | 1/2001 | ............. 239/165 |
| EP | 0 464 291 A1 | 1/1992 | |
| EP | 1 070 455 A2 | 1/2001 | |
| EP | 1 070 455 A3 | 1/2001 | |
| FR | 2 560 533 | 9/1985 | |
| FR | 2 595 205 | 9/1987 | |
| FR | 2 813 754 | 3/2002 | |

OTHER PUBLICATIONS

Spra-Coupe 4440—Publication date prior to May 27, 2003 (2 pages).
Hagie Sprayer Advertising Web Page—Publication date June 17, 2003 (1 page).
Photo of Hagie 90' Boom—Publication date prior to May 27, 2003 (1 page).

* cited by examiner

*Primary Examiner*—Naoko Slack (57) ABSTRACT

An easily manufactured large boom construction includes a plurality of main tube support sections fabricated from plate material of differing material thickness, grade and section dependent on load. The tube support sections include apertured areas which provide a preliminary snap-fit of the main tubes to significantly reduce need for additional fixturing. The opposite ends of diagonal tubes pass through apertures in the fabricated support sections for accurate tube location without complicated weld fixtures or precise tube length and cut end angle tolerances. The tubes are welded on opposite sides of the sections to eliminate need for tube-to-tube connections or connections wherein a cut end edge has to be precisely placed against a planar surface. An inverted right triangle boom cross section with wing over-top fold configuration ability provides strength, stiffness and infinite nozzle placement possibilities.

36 Claims, 7 Drawing Sheets

AGRICULTURAL BOOM STRUCTURE

FIELD OF THE INVENTION

The present invention relates generally to boom structure for agricultural implements such as field sprayers.

BACKGROUND OF THE INVENTION

The desire to increase productivity and reduce the number of passes over a field, implements with folding booms such as field sprayers have been designed for increased working widths and increased operating speeds. Booms which fold out to define a working width of up to 120 feet or more are now available. As boom size, weight and operating speed increase, large inertial loads are encountered. Building a large boom with reduced weight, easy and repeatable manufacturability and structural soundness and stiffness has become an increasing problem.

The wide booms must fold to achieve a narrowed transport width. Horizontal folding reduces fold height requirements but results in extreme torsional stresses on the boom structure. For horizontal folding, the boom depth dimension is usually minimized, which results in reducing the boom strength and stiffness in the fore-and-aft direction. Over-top folding relieves the torsional stress but can result in unacceptable fold heights with large booms.

A typical boom construction includes a triangular or L-shaped configuration with the base triangle or the lower leg of the L-shaped configuration at the bottom of the boom. Such structural designs that are wider at the bottom than at the top often interfere with desired spray nozzle positioning. Spray nozzle spacing options are limited or operators have to offset certain nozzles from main plumbing line, and uneven spray patterns often result. In the L-shaped designs, most fore-and-aft loads pass through to the centerframe support assembly through the two main lower beams or tubes which advantageously facilitates mounting of boom fold cylinders and tilt pivot structure at the the bottom with the cylinder located at the top. Attempts at providing alternate configurations have met with difficulties, particularly if in the alternate configuration loading is transferred towards the top of the boom. If the fold cylinder and pivot are moved towards the top of the boom and centerframe support assembly to better align with the boom loading, a large separation between the bottom of the boom and centerframe will occur when the boom section is tilted upwardly, while an overlap occurs when the section is tilted downwardly. This separation and overlap cause significant spray pattern problems. Therefore, providing such alternate boom configurations have met with significant design difficulties caused by the load transfers and tilt and fold requirements.

Large booms with tubular designs are often very difficult to manufacture. Individual tube sections can have wide length and angle of cut tolerances. Where tube-to-tube connections are required, such tolerances increase the difficulty and cost of welding tube ends together, and the structural integrity of such tube end weld connections is less than optimum. In addition, conventional tubular boom construction methods require a complex and expensive boom weldment fixture.

SUMMARY OF THE INVENTION

It is therefore an object of the present invention to provide an improved boom structure. It is another object to provide such a structure which overcomes one or more of the aforementioned problems.

It is another object of the present invention to provide an improved boom structure which is particularly useful for use with agricultural implements such as self-propelled field sprayers. It is another object to provide such a structure which relatively light and yet is strong and has desired stiffness. It is a further object to provide such a structure which is easy and inexpensive to manufacture.

It is still another object of the invention to provide an improved boom structure which reduces the cost of tooling, manufacturing and production. It is a further object to provide such a structure which reduces the amount of fixturing required during manufacture and reduces or eliminates problems associated with cut end joint tolerances and tube to tube end connections. It is another object to provide such a structure having tube support members with optimized weight and strength.

It is yet another object of the present invention to provide an improved boom structure which facilitates better nozzle or dispenser and supply tube plumbing placement than at least most conventional boom structures. It is a further object to provide such a structure which is wider at the top than at the bottom and which has improved strength in the fore-and-aft direction. It is another object to provide such a structure which is particularly advantageous for an over-top wing fold configuration and which overcomes design difficulties in boom tilt and fold construction caused by boom design configurations which transfer main loading towards the top of the boom.

An easily manufactured boom construction particularly useful for large agricultural folding booms includes a plurality of main tube support sections fabricated from plate material of differing thickness and section dependent on the load to be carried by the material. Thicker, higher strength, or higher grade material is used only in high stress areas so that cost and weight are reduced and weight distribution and strength are improved. The material can be laser cut from steel stock and fitted together with the use of tab-slot locators to create a section substantially more precise than is available using saw-cut pieces. The tube support sections include apertured or slotted areas which provide a preliminary snap-fit of the main tubes to significantly reduce need for additional fixturing so that tooling and manufacturing costs are reduced when compared with at least most conventional boom constructions. The opposite ends of diagonal tubes pass through apertures in the fabricated support sections, rather than mate against the surface of the plates. Therefore the diagonal tubes can be precisely located without the need for expensive and complicated weld fixtures. Diagonal tube length and cut end angle tolerances can be substantially greater than possible with structures which use tube end to flat plate mating surfaces or direct tube end to tube end connections. Since the tube ends actually pass through the support sections, each end can be welded on opposite sides of the sections at conveniently accessed locations. By eliminating most or all tube-to-tube connections and connections wherein a cut end edge has to be precisely placed against a planar surface, welds can be made more quickly, easily and reliably than with at least most previously available conventional boom constructions. By making diagonal tube connections at adjacent support sections, welds at intermediate locations on the diagonal tubes are eliminated.

In the embodiment shown, the cross section of the boom is in the shape of an inverted right triangle with the base of the triangle at an uppermost portion of the boom. The apex of the triangular cross section is located at a lowermost portion of the boom, and the forwardly facing portion of the boom lies generally in an upright plane. The inverted construction provides improved nozzle and plumbing, much of which can be outside the boom cross section, and better facilitates over-top folding of a boom section compared to most previous boom designs. A unique torque-tube inner hinge design helps facilitate the inverted section and permits the boom fold cylinder and tilt pivot structure to be located near the bottom of the boom with the tilt cylinder near the top of the boom to avoid spray pattern overlaps or gaps with boom tilting. The wider upper base of the triangular cross section improves boom strength and stiffness and allows steel to be utilized throughout the boom if desired rather than more expensive, lighter materials which often increase joint fabrication difficulties. An outer wing over-top fold configuration allows for the maximum depth dimension of the wing structure and maximized strength of the structure in the fore-aft direction.

These and other objects, features and advantages of the present invention will become apparent from the detailed description which follows taken in view of the drawings.

DESCRIPTION OF THE PREFERRED EMBODIMENT

Figure 1:
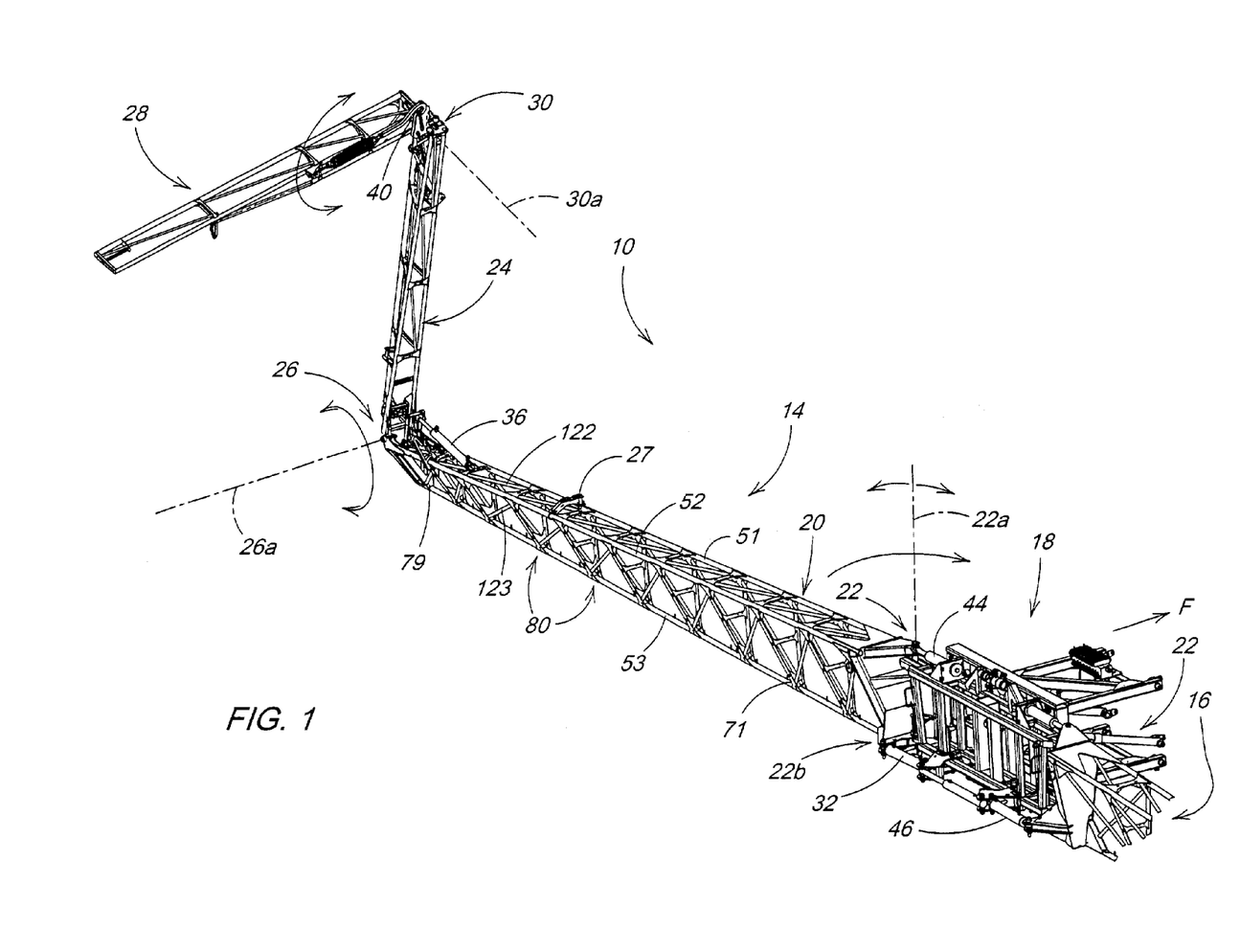
FIG. 1 is a rear perspective view of a portion of a wide folding boom structure.

Referring now to FIG. 1, therein is shown a portion of an agricultural implement 10 such as a large field sprayer adapter for forward movement (F) over a field to be sprayed. The implement 10 includes right- and left-hand boom assemblies 14 and 16 supported on a vehicle or trailer (not shown) by a lift frame support or centerframe assembly 18. The boom assemblies 14 and 16 are similar in construction and, as shown, include an inner boom section 20 connected to the support assembly 18 for pivoting about an upright axis 22a by a structural hinge 22 for movement between an extended field working position (shown) and a forwardly folded position wherein the section 20 extends forwardly from the support assembly 18. An intermediate boom section 24 is connected by hinge structure 26 to the outer end of the section 20 for pivoting between an outwardly extended field working position and a transport position overlying the section 20 against a stop 27 on the top of the section 20. An outermost boom section 28 is pivotally connected to the outer end of the intermediate boom section 24 by a tip breakaway hinge structure 30 for folding about an axis to a transport position adjacent the aft side of the section 24. The integrated breakaway of the structure 30 allows the tip of the boom assembly to move rearwardly against a spring bias upon encountering an obstacle. The tip to tip width of the structure shown in FIG. 1 can be up to 120 feet or more.

Hydraulic boom fold cylinders 32, 36 and 40 are connected at the hinge locations 22, 26 and 30 to effect the positioning of the boom sections relative to each other and to the support assembly 18. Boom attitude or tilt control cylinders 44 and 46 extend between the assembly 18 and the upper portions of the structural hinges 22 connecting the boom assemblies 14 and 16 to the assembly 18. The structural hinge 22 provides joint structure at location 22b about which the boom section both 20 tilts and folds. The location 22b is near the bottom of the hinge and centerframe and facilitates a boom tilt of approximately 15 degrees about a tilt axis which extends horizontally in the fore-and-aft direction when the boom is in the field working position. The structural hinge 22 also provides approximately 90 degrees of fold so the boom extends transversely in the field working position and fore-and-aft in a forwardly folded transport position. Although a three section boom assembly 14 is shown, the boom construction described below for the inner boom section 20 may be utilized with other types of boom assemblies.

Figures 6, 7, 8:
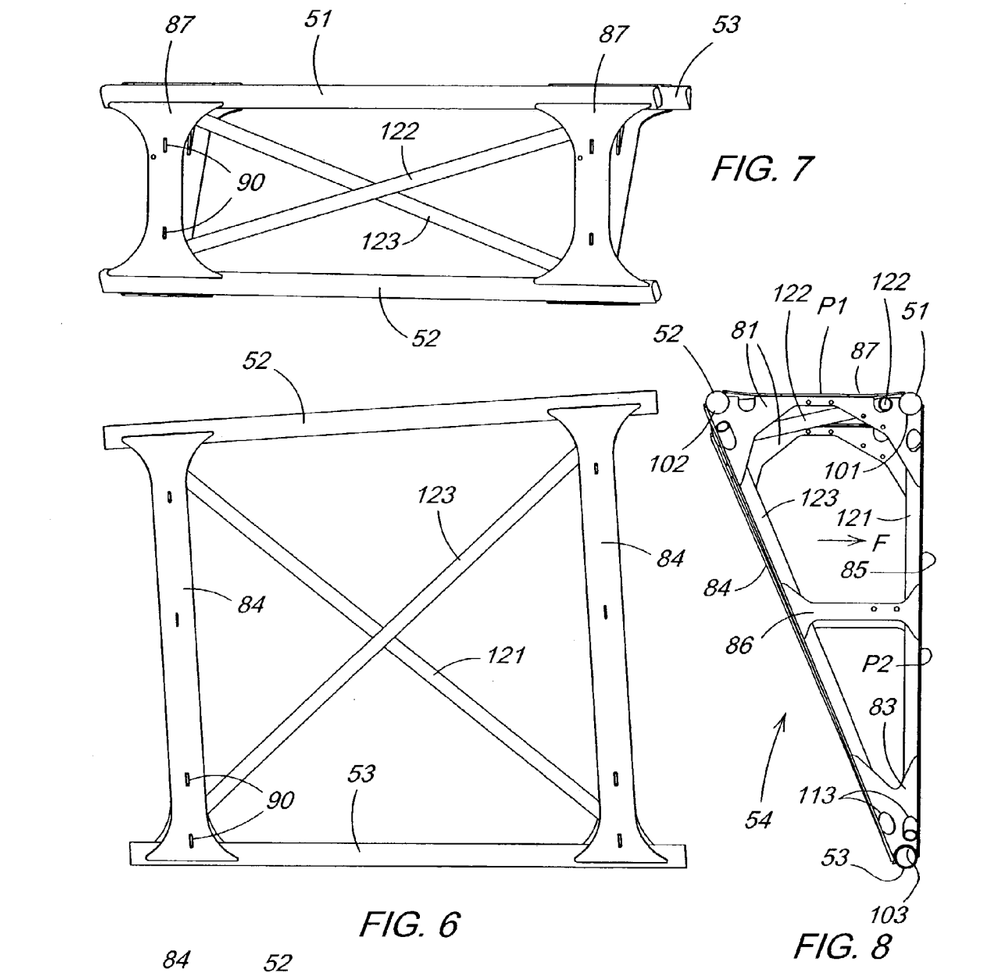
FIG. 6 is a rear view of the boom portion shown in FIG. 3.
FIG. 7 is a top view of the boom portion shown in FIG. 6.
FIG. 8 is an right side end view of the portion shown in FIG. 6.
Figure 9:
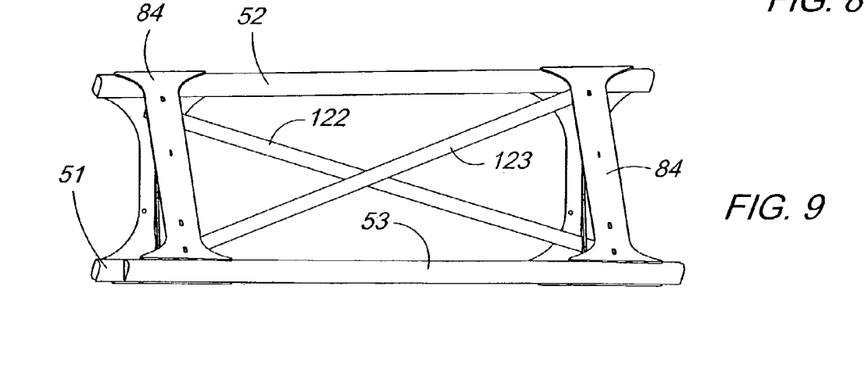
FIG. 9 is a bottom view of the portion shown in FIG. 6.

The construction of the inner boom section 20 (FIGS. 2–12) provides an inverted triangle cross section. As best seen in FIGS. 5 and 8 two main upper beams or tubes 51 and 52 define the base of the triangle and a main lower beam or tube 53 defining the inverted apex of the triangle. The beams 51–53 extend transversely between the hinge 22 and hinge structure 26. As shown, the cross section is in the form of a right triangle with the upper beams 51 and 52 lying generally in a horizontal plane P1 and with the lower beam 53 and upper beam 51 defining an upright plane P2. The upright plane P2 faces the forward direction (F) or direction of travel of the machine when the boom sections are in the unfolded field working position. The triangular cross section provides a substantially unencumbered space indicated generally at 54 behind the lower beam 53 and below the beams 51 and 52 for supporting supply lines or other plumbing and material dispensers in one of a possibly infinite number of patterns.

Figure 10:
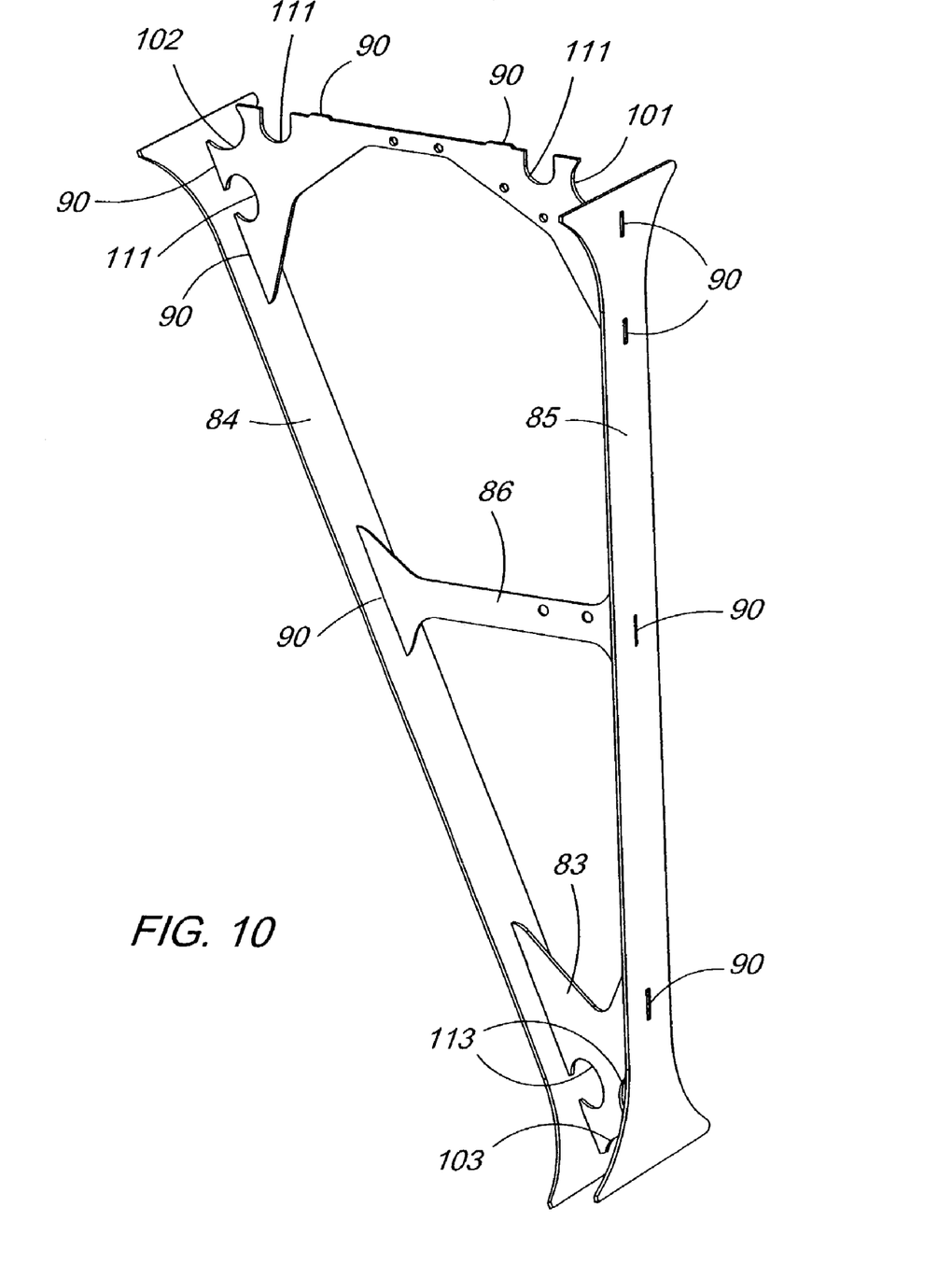
FIG. 10 is a perspective view of one of the fabricated tube-receiving sections for the inner boom of FIG. 2.

The construction of the section 20 includes a plurality beam or tube spacing members 71–79 (FIG. 1), each of similar construction but decreasing in dimensions from the member 71 outwardly to the member 79. Each of the spacing members 71–79 is fabricated as a subweldment 80 including a top web 81, a bottom web 83, a rear flange piece 84, a front flange piece 85, a central connecting piece 86, and a top flange piece 87. The weldment is in the form of an I-beam section which is narrow at the bottom extremity and wide at the top extremity. Laser cut tab and slot combinations with a slight interference fit at locations indicated at 90 accurately center the tab in the slot to assembly the subweldment 80. The top and bottom webs 81 and 83 include accurately cut apertures or slots 101, 102 and 103 conforming to a portion of the outer surface of the main beams or tubes 51, 52 and 53, respectively. After the flange pieces 84, 85 and 87 are welded to the webs 81 and 83, the slots 101–103 along with the slightly flared ends of the flanges define openings slightly smaller than the cross sectional dimension of the tubes 51–53 so that the tubes are snapped into place on the tube spacing members 71–79 during assembly of the section 20 and then welded to the subweldment 80. Therefore, the amount and complexity of the weld fixturing necessary for fabrication is substantially reduced compared to most conventional boom fabrication methods. In addition, the material thickness, material grade and/or strength of each of the pieces of the subweldment 80 can be varied according to the loads encountered at the piece so that cost, weight and total area of the subweldment can be optimized. By way of example only without limitation, the top and bottom webs 81 and 83 which receive heavy loads from the main tubes 51–53 can be fabricated from grade 80 steel of 0.088 inch thickness while the flange pieces 84, 85 and 87 and the connecting piece 86, which carry much lighter loads, can be fabricated from a lower grade, thinner material such as 0.075 inch thick grade 50 steel.

The upper and lower webs 81 and 83 include apertures or slots 111 and 113 for receiving diagonal tubes or brace members 121, 122 and 123 extending between the subweldments 80 of adjacent beam spacing members. The brace members 121–123 extend through the apertures 111–113 and are fixed to the webs 81 and 83 by welds which extend partially around the circumference of the brace member ends on both sides of the webs. The brace members 121–123 can be precisely located without weld fixtures and without precise tube end and tube length cuts. Since the tube ends actually pass through the webs 81–83, each end can be welded on opposite sides of the webs at conveniently accessed locations. Tube-to-tube connections and connections wherein a cut end edge has to be precisely placed against a planar surface can be eliminated using the above-described configuration.

Figure 2:
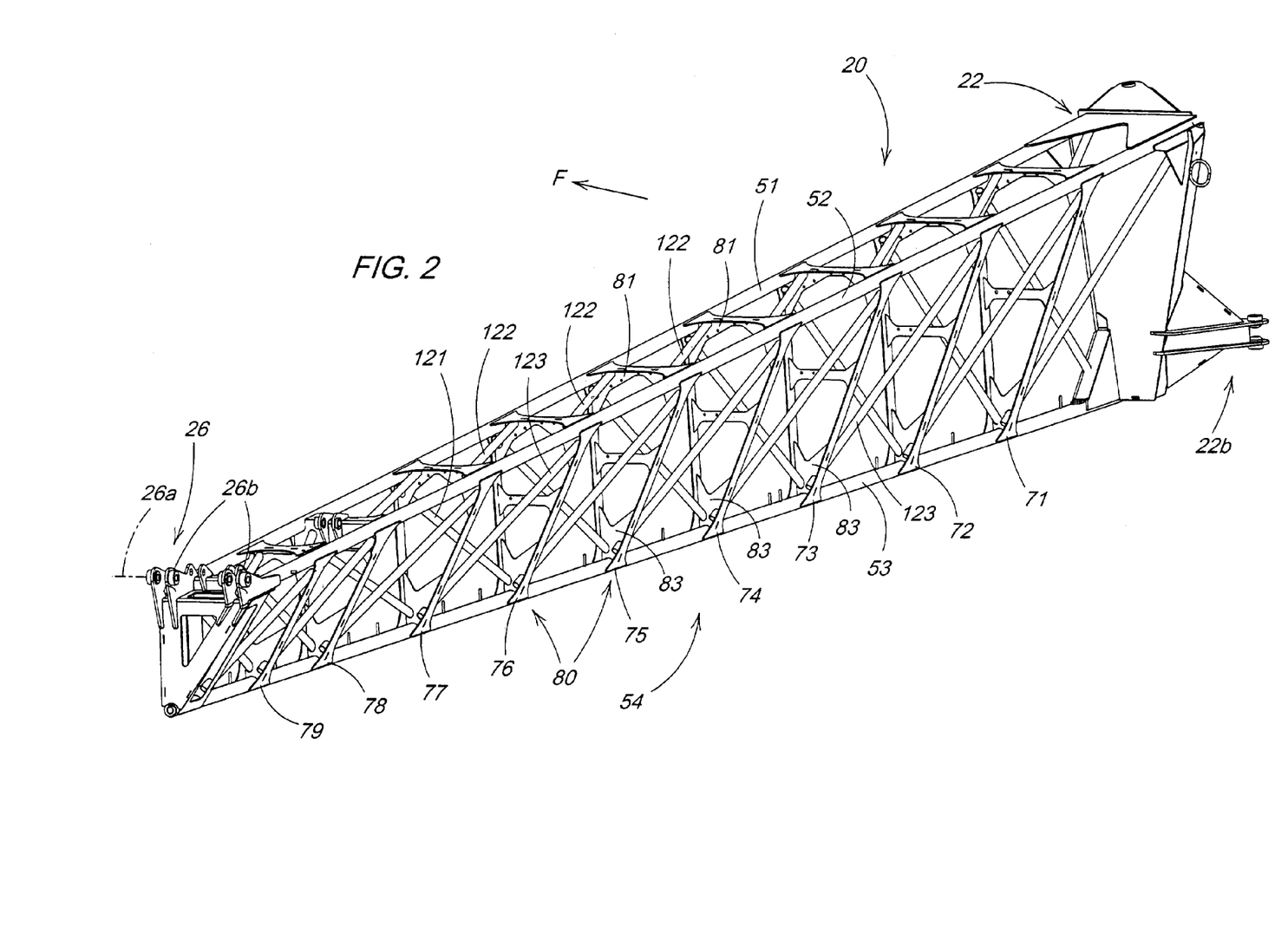
FIG. 2 is an enlarged perspective view of the inner boom section of the structure of FIG. 1.
Figures 3, 4, 5:
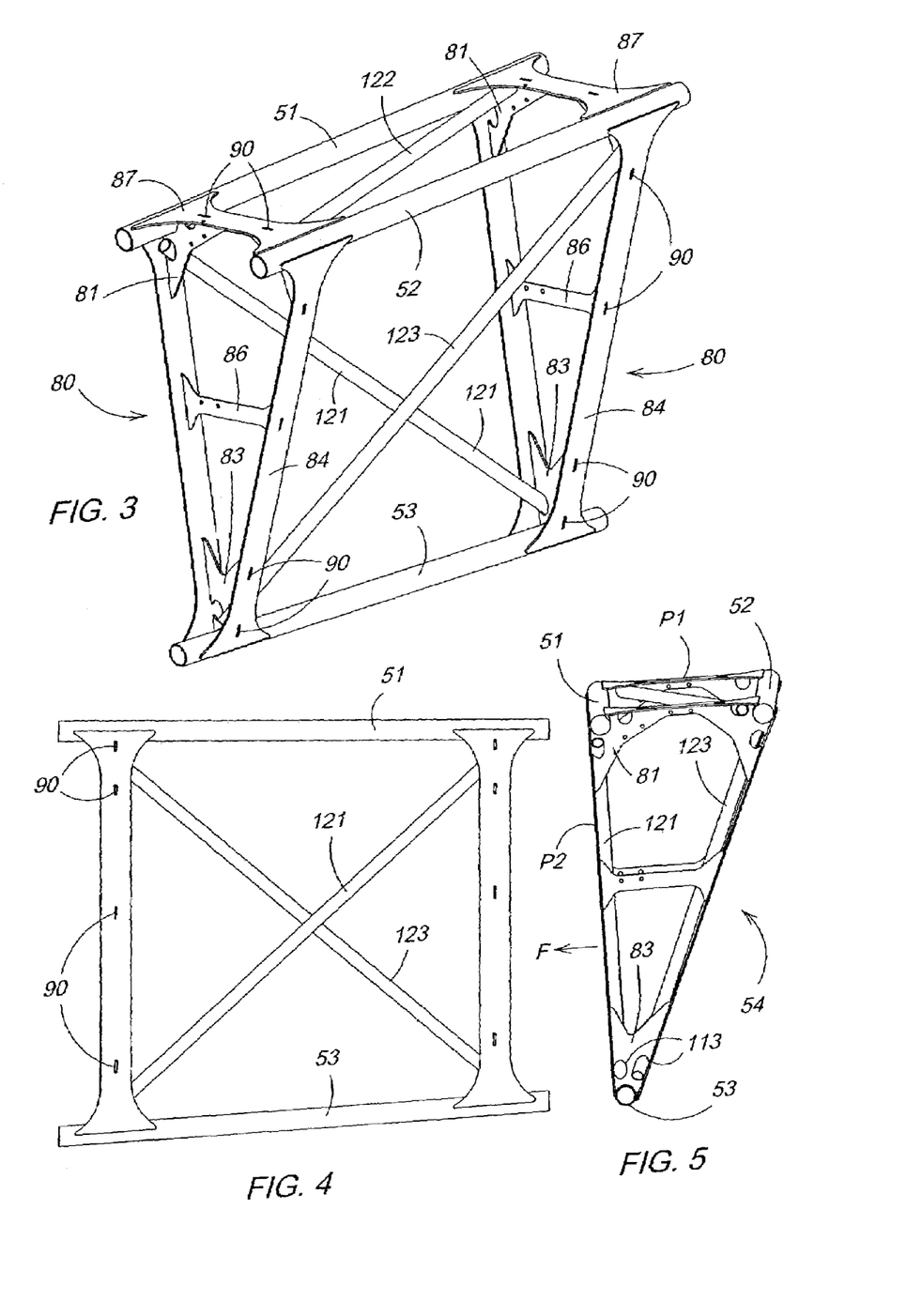
FIG. 3 is an enlarged rear perspective view of a portion of the inner boom of FIG. 2.
FIG. 4 is a front view of the portion of the inner boom shown in FIG. 3.
FIG. 5 is a left side end view of the boom portion shown in FIG. 4.

As shown in FIGS. 2 and 3, a truss construction is provided with the upper brace member 122 having an outer end connected to the web 81 next to the rear upper tube 52 and an inner end connected to the next adjacent web 81 next to the front upper tube 51. The upper innermost end of the diagonal brace member 123 is connected to the web 81 adjacent the outer end of the upper brace member 122. Each front diagonal brace 121 has an outermost upper end connected to the web 81 adjacent the innermost end of the upper brace member 122, and a lower innermost end connected to the web 83 adjacent the lower outermost end of the diagonal brace member 123 which extends between the lower tubes 53 and the upper front tube 51. As shown, the diagonal brace members 121–123 extend between adjacent tube spacing members, and no welds are required at central locations on the brace members. End-to-end welds of the diagonal brace members 121–123 and direct welds of the brace members to the main tubes 51, 52 and 53 can be eliminated.

Figure 11:
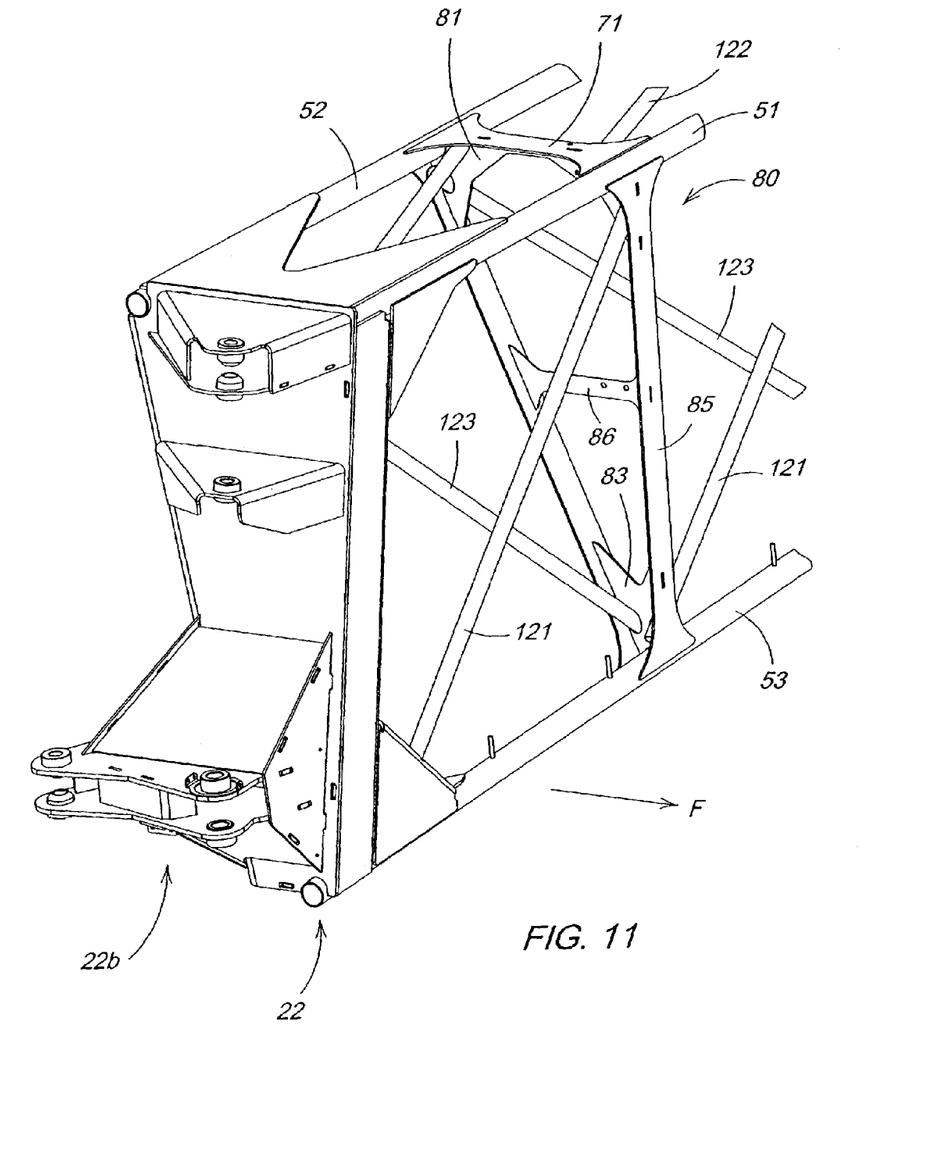
FIG. 11 is an enlarged perspective view of the inner hinge area of the boom section of FIG. 2 showing the torque tube hinge construction
Figure 12:
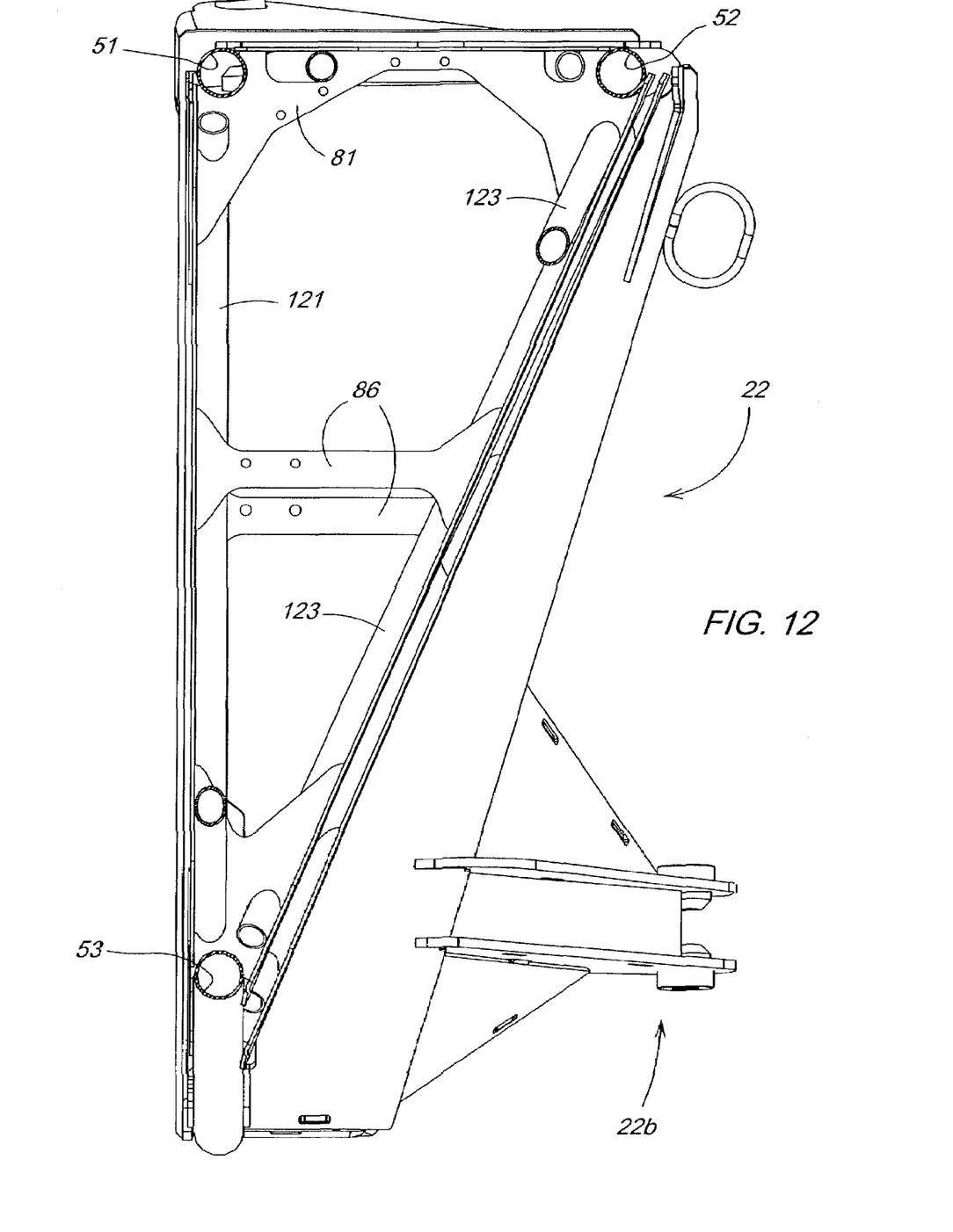
FIG. 12 is an end view, partially in section, of the hinge area of FIG. 11.

The inner structural hinge 22 transfers loading from the upper portion of the boom section 20 towards the bottom of the boom section at the hinge area and thereby permits the pivot and fold structure to remain near the bottom of the boom and the centerframe assembly 18 to avoid the problems of gapping and overlap as the boom is tilted about a fore-and-aft axis during field working operations. The outer hinge structure 26 advantageously provides hinge pivot locations 26b which are aligned with the upper tubes 51 and 52 for providing a sturdy pivot area for upward and over center folding of the boom section 24 about the axis 26a. As shown, the structural hinge 22 and the hinge structure 26 also use a tab and slot construction to facilitate assembly with a minimum of additional fixturing.

Having described the preferred embodiment, it will become apparent that various modifications can be made without departing from the scope of the invention as defined in the accompanying claims.

We claim:

1. Boom structure for a boom of a mobile agricultural implement adapted for forward movement over the ground, the boom structure including:

first and second transversely extending beam members;

a third transversely extending beam member offset below the first and second beam members;

a plurality of beam spacing members spaced transversely on and spacing the first, second and third beam members in generally a triangular configuration defining a triangle base between the first and second beam members at an upper extremity of the triangular configuration;

wherein the beam members comprise tubular members, and wherein the beam spacing members include slot structure receiving the beam members and facilitating assembly of the beam members and the beam spacing members independently of additional fixturing; and wherein the slot structure receives the tubular members in a snap-fit fashion for fixturing the boom structure during boom assembly.

2. Boom structure for a boom of a mobile agricultural implement adapted for forward movement over the ground, the boom structure including:

first and second transversely extending beam members;

a third transversely extending beam member offset below the first and second beam members;

a plurality of beam spacing members spaced transversely on and spacing the first, second and third beam members in generally a triangular configuration defining a triangle base between the first and second beam members at an upper extremity of the triangular configuration; and wherein the beam spacing members comprise fabricated plate structure, the plate structure in selected areas of a spacing member differing in at least one of the following depending on plate structure load in the areas: thickness, grade and strength.

3. Boom structure for a boom of a mobile agricultural implement adapted for forward movement over the ground, the boom structure including:

first and second transversely extending beam members;

a third transversely extending beam member offset below the first and second beam members;

a plurality of beam spacing members spaced transversely on and spacing the first, second and third beam members in generally a triangular configuration defining a triangle base between the first and second beam members at an upper extremity of the triangular configuration; and further comprising diagonal brace members extending between adjacent beam spacing members, the brace members extending through apertures in the beam spacing members and secured to the beam spacing members.

4. The boom structure as set forth in claim 3 wherein the ends of the brace members are welded to the beam spacing members.

5. The boom structure as set forth in claim 4 wherein the brace members have opposite ends, and the brace members are devoid of direct welds of the ends to adjacent brace members and adjacent beam structures, whereby connection of the brace members to other brace members and to the beam structures is through the beam spacing members.

6. The boom structure as set forth in claim 5 wherein the beam spacing members comprise fabricated plate structure and the opposite ends of the brace members extend through the plate structure and are welded on opposite sides of the plate structure.

7. Boom structure for a boom of a mobile agricultural implement adapted for forward movement over the ground, the boom structure comprising:

first, second and third transversely extending beam members;

beam spacing members located at transversely spaced locations along the first, second and third beam members and spacing the beam members in generally a triangular configuration;

wherein the beam spacing members comprise a fabricated plate structure; and wherein the beam spacing members are apertured to facilitate snap-fitting of the beam members to the beam spacing members and reduce need for fixturing during assembly of the boom structure.

8. The boom structure as set forth in claim 7 further comprising diagonal braces having opposite ends and extending between the beam members, the diagonal braces indirectly connected to the beam members through the plate structure thereby avoiding end welding of the braces directly to the beam members.

9. The boom structure as set forth in claim 8 wherein the beam spacing members include openings for receiving ends of the braces therethrough and wherein the ends of the braces are fixed to the beam spacing members.

10. The boom structure as set forth in claim 9 wherein the ends of the braces are connected to adjacent beam spacing members and the ends only of the braces are fixed to the beam spacing members.

11. The boom structure as set forth in claim 10 wherein the ends of the braces are connected to other diagonal braces through the beam spacing members to avoid tube end to tube end welds.

12. The boom structure as set forth in claim 7 wherein the beam spacing members support the beam members in an inverted triangle-shaped configuration with the first and second beams defining an upper base of the triangle-shaped configuration.

13. The boom structure as set forth in claim 12 further including hinge structure connected to the first and second beams and defining a horizontal boom fold hinge permitting generally vertical folding of a portion of the boom structure.

14. Boom structure for a boom of a mobile agricultural implement adapted for forward movement over the ground, the boom structure comprising:

first, second and third transversely extending beam members;

beam spacing members located at transversely spaced locations alone the first, second and third beam members and spacing the beam members in generally a triangular configuration;

wherein the beam spacing members comprise a fabricated plate structure supporting the beam members in an inverted triangle-shaped configuration with the first and second beams defining an upper base of the triangle-shaped configuration; and further including an end torque tube structure supporting upright hinge structure permitting generally horizontal folding of a portion of the boom structure about a boom support frame and tilting about a tilt axis, the torque tube structure transferring loading from the first and second beams to a lower portion of the upright hinge structure.

15. The boom structure as set forth in claim 14 including an inner section, the upright hinge structure connected to an innermost portion of the inner section, and a second section, wherein the horizontal boom fold hinge connects the second section to an outermost portion of the inner section, wherein the inner section is foldable horizontally relative to the boom support frame and the second section is foldable vertically relative to the inner section.

16. The boom structure as set forth in claim 15 further including an outermost section and hinge structure connecting the outermost section to an end of the second section for pivoting about a generally horizontal axis relative to the second section.

17. Boom structure for a boom of a mobile agricultural implement adapted for forward movement over the ground, the boom structure comprising:

first, second and third transversely extending beam members;

beam spacing members located at transversely spaced locations along the first, second and third beam members and spacing the beam members in generally a triangular configuration;

wherein the beam spacing members comprise a fabricated plate structure; and wherein the beam spacing members include plates of differing thickness depending on load capacity on the plate so that the weight of the beam spacing members can be reduced over a comparable beam spacing member of unitary thickness having the same load capacity.

18. Boom structure for a boom of a mobile agricultural implement adapted for forward movement over the ground, the boom structure comprising:

a plurality of transversely extending rigid beam members;

beam spacing members located at transversely spaced fixed locations along the beam members and spacing the beam members relative to each other;

wherein the beam spacing members comprise apertured structure having outwardly opening slots facilitating fitting of the beam members to the beam spacing members; and diagonal rigid brace members connected directly to the apertured structure adjacent two of the rigid beam members and connecting the brace members to the adjacent two of the rigid beam members independently of direct connection of the brace member to the rigid beam members.

19. Boom structure for a boom of a mobile agricultural implement adapted for forward movement over the ground, the boom structure comprising:

a plurality of transversely extending beam members;

beam spacing members located at transversely spaced locations along the beam members and spacing the beam members relative to each other;

wherein the beam spacing members comprise apertured structure facilitating fitting of the beam members to the beam spacing members during assembly; and including diagonal brace structure having opposite ends passing through apertures in the beam spacing members, the opposite ends secured to the beam spacing members adjacent the apertures.

20. The boom structure as set forth in claim 19 wherein the diagonal brace structure and the beam members are secured to the beam spacing members to obviate need for welds connecting the opposite ends together and to obviate need to connect the opposite ends directly to the beam members.

21. The boom structure as set forth in claim 20 wherein each of the ends of the diagonal brace structure is welded to opposite sides of the beam spacing members.

22. The boom structure as set forth in claim 19 wherein each of the diagonal brace structures includes opposite ends connected to adjacent beam spacing members so that each of the diagonal brace structures is connected to only two beam spacing members.

23. Boom structure for a boom of a mobile agricultural implement adapted for forward movement over the ground, the boom structure comprising:
- a plurality of transversely extending beam members;
- beam spacing members located at transversely spaced locations along the beam members and spacing the beam members relative to each other;
- wherein the beam spacing members comprise apertured structure facilitating fitting of the beam members to the beam spacing members during assembly; and
- wherein the beam members comprise three beam members and the beam spacing members define an inverted right triangle boom cross section with a triangle base located at a top portion of the boom.

24. The boom structure as set forth in claim 23 wherein the cross section defines a leading upright boom plane.

25. Boom structure for a boom of a mobile agricultural implement adapted for forward movement over the ground, the boom structure comprising:
- a plurality of transversely extending tubular members;
- support members located at transversely spaced locations along the tubular members and spacing the tubular members relative to each other to define an inverted triangle boom cross section;
- diagonal brace structure extending between the support members and including opposite ends passing through aperture structure in the support members; and
- means connecting the ends of the diagonal brace structure to the support members adjacent the aperture structure without need for direct brace structure to tubular member connections and without direct end to end connections of the diagonal brace structure.

26. The boom structure as set forth in claim 25 wherein the support members comprise self-fixturing structure supporting the tubular members in a desired boom configuration during assembly.

27. The boom structure as set forth in claim 26 wherein the aperture structure includes slots receiving the tubular members in snap-fit fashion.

28. The boom structure as set forth in claim 25 wherein the support members comprise fabricated plate structure formed from planar material, the plate structure in one of the support members varying in at least one of the following dependent on loading in the plate structure by the tubular members and by the diagonal brace structure: material thickness, material grade and material strength.

29. The boom structure as set forth in claim 25 wherein the means connecting the ends comprises welds joining each of the ends to opposite sides of the support members.

30. The boom structure as set forth in claim 29 wherein the welds extend only partially around each end on the opposite sides.

31. A method of fabricating a large boom adapted for forward movement over the around in generally a horizontal attitude and for folding to a compact transport position, the method comprising:
- providing beam support members having a triangular configuration;
- forming beam receiving slots at corners of the triangular configuration of the beam support members;
- providing elongated beam structures;
- substantially fixturing the beam structures in the triangular configuration by placing the beam structure in the slots of a plurality of the support members at transverse locations;
- fixing the beam structure to the beam support members while the beam structure is fixtured in the triangular configuration to hold the beam structure in a boom configuration having a triangular cross section; and
- further including the step providing apertures in the beam support member adjacent the slots, inserting diagonal braces through the slots, and welding ends of the diagonal braces to the support members adjacent the apertures.

32. The method as set forth in claim 31 wherein the step of welding the ends includes welding the ends to adjacent beam support members.

33. The method as set forth in claim 32 wherein only the ends of the diagonal braces are fixed to the beam support members.

34. A method of fabricating a large boom adapted for forward movement over the around in generally a horizontal attitude and for folding to a compact transport position, the method comprising:
- providing beam support members having a triangular configuration;
- forming beam receiving slots at corners of the triangular configuration of the beam support members;
- providing elongated beam structures;
- substantially fixturing the beam structures in the triangular configuration by placing the beam structure in the slots of a plurality of the support members at transverse locations;
- fixing the beam structure to the beam support members while the beam structure is fixtured in the triangular configuration to hold the beam structure in a boom configuration having a triangular cross section; and
- wherein the step of fixturing the beam structures includes fixing the beam structure in an inverted right triangular configuration with the base of the right triangular configuration defined by two of the beam structures located at an upper extremity of the boom.

35. The method as set forth in claim 34 including the step of attaching a vertical fold hinge at first ends of the said two beam structures.

36. The method as set forth in claim 35 including attaching a horizontal fold structural hinge at second ends opposite said first ends of the two beam structures.

* * * * *